US010341804B2

(12) United States Patent
Poggesi et al.

(10) Patent No.: US 10,341,804 B2
(45) Date of Patent: Jul. 2, 2019

(54) SYSTEM, METHOD AND COMPUTER PROGRAM PRODUCT FOR ACCESSING DATA FROM A SOURCE BY A VARIETY OF METHODS TO IMPROVE PERFORMANCE AND ENSURE DATA INTEGRITY

(75) Inventors: Alberto Poggesi, San Jose, CA (US); Anthony C. Sumrall, San Jose, CA (US); Thomas A. Thackrey, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1619 days.

(21) Appl. No.: 12/607,928

(22) Filed: Oct. 28, 2009

(65) Prior Publication Data

US 2011/0099289 A1    Apr. 28, 2011

(51) Int. Cl.
| | | |
|---|---|---|
| G06F 15/16 | (2006.01) |
| G06F 17/30 | (2006.01) |
| H04W 4/00 | (2018.01) |
| H04W 4/60 | (2018.01) |
| G06F 3/06 | (2006.01) |

(52) U.S. Cl.
CPC .............. *H04W 4/00* (2013.01); *H04W 4/003* (2013.01); *H04W 4/60* (2018.02); *G06F 3/0622* (2013.01)

(58) Field of Classification Search
CPC ....... G06F 3/0622; H04W 4/00; H04W 4/003; H04W 4/60
USPC .......................................................... 709/234
See application file for complete search history.

(56) References Cited

U.S. PATENT DOCUMENTS

| | | | |
|---|---|---|---|
| 6,370,614 B1 | 4/2002 | Teoman et al. ................ 711/113 |
| 6,658,417 B1 * | 12/2003 | Stakutis et al. |
| 6,718,372 B1 * | 4/2004 | Bober ........................... 709/217 |
| 2007/0067624 A1 | 3/2007 | England et al. .............. 713/164 |

OTHER PUBLICATIONS

Seiler et al., "Larrabee: A Many-Core x86 Architecture for Visual Computing" ACM Transactions on Graphics, vol. 27, No. 3, Article 18, Publication Date: Aug. 2008.
Prabhu et al., "Using Thread-Level Speculation to Simplify Manual Parallelization" ACM, San Diego, CA: Jun. 11-13, 2003.

* cited by examiner

*Primary Examiner* — Jerry Dennison
*Assistant Examiner* — Kishin G Belani
(74) *Attorney, Agent, or Firm* — Zilka-Kotab, P.C.

(57) ABSTRACT

According to one embodiment, a system includes a data storage device having data stored therein and a native computer system having resident thereon a controlling operating system in communication with the data storage device. The system also includes a primary computer system having resident thereon a primary operating system in communication with the native computer system via a first connection, the primary computer system being in communication with the data storage device via a second connection that is not in communication with the native computer system, the primary computer system having a processor executing a primary application. A volume on the data storage device is under logical control of the controlling operating system of the native computer system, and the primary computer system reads or writes data to the volume directly via the second connection. Other systems, methods and computer program products are also described relating to accessing data.

16 Claims, 8 Drawing Sheets

US 10,341,804 B2

SYSTEM, METHOD AND COMPUTER PROGRAM PRODUCT FOR ACCESSING DATA FROM A SOURCE BY A VARIETY OF METHODS TO IMPROVE PERFORMANCE AND ENSURE DATA INTEGRITY

BACKGROUND

The present invention relates to computer systems and particularly to execution of operations, such as I/O (input/output) operations, for one computer architecture on another computer architecture.

In some computer architectures, the operations performed for a "native" architecture, such as native I/O operations, cannot be executed directly on a "primary" architecture. In such circumstances, the "native" architecture and the "primary" architecture are not interoperable.

The non-interoperability of computer systems of different architectures often arises in connection with the IBM z/Architecture, the IBM z/Operating System and other closed computer architectures. Such closed architectures are prevalent for mainframe computers and are in contrast to computer systems running Windows, Linux, Unix, and other operating systems on other system architectures. The z/Architecture is IBM's 64-bit computing architecture for the current generation of IBM's mainframe computers as of the filing date. The IBM z/Architecture systems retain backward compatibility with previous IBM 31-bit (ESA/390) and 24-bit (S/370) architectures.

In the native IBM computer z/architecture using the IBM z/OS or other IBM operating systems (OSs), I/O operations are complex and require logic to be applied to the data to locate it on direct access storage devices (DASDs), to block and unblock, and to provide other similar functions. Typically, the processor, sometimes known as a central processing unit (CPU), creates channel programs to enable a channel controller to handle I/O operations. The channel controller, upon receiving a channel program, then executes without assistance from the processor (CPU). When execution is complete or when there is an error, the channel controller communicates back to the CPU using an interrupt. The channel programs for I/O operations are executed in mainframe computers by the IBM channel subsystem (CSS). The IBM CSS directs the flow of information between I/O devices and main storage and uses one or more channel paths as the communication link to or from I/O devices. The channel subsystem performs path-management by testing for channel-path availability and by choosing an available channel path.

Computer systems that use channels for I/O have special hardware components that handle input/output operations in their entirety independently of the systems' CPU(s). The CPU of a system that uses channel I/O typically has only machine instructions to pass input/output commands to the specialized I/O hardware in the form of channel programs. I/O operations thereafter proceed without intervention from the CPU until an event requiring notification of the operating system occurs, at which point the I/O hardware signals an interrupt to the CPU.

A channel is an independent hardware component that coordinates all I/O operations for its attached I/O controllers and/or devices. A channel is an entity that handles all details of I/O operations after being given a list of I/O operations to execute in the form of a channel program. The IBM CSS communicates with I/O devices over channel paths connected between the CSS and I/O devices or their control units. Each channel may support one or more I/O controllers and/or I/O devices. Typically, there is one physical interface per channel, but is not so limited.

Channel programs contain commands for the channel and the various controllers and devices to which the channel connects. The operating system prepares a list of I/O commands and then executes a single I/O machine instruction to initiate the channel program. The channel thereafter assumes control of the I/O operations until they are completed.

In IBM systems, the channel programs impart flexibility that frees CPUs from the overhead of starting, monitoring, and managing individual I/O operations. In IBM mainframes, the computer system uses only the specialized IBM channel hardware that is dedicated to I/O operations.

In IBM mainframe computer systems, CPUs are one of several powerful hardware processors that work in parallel. In addition to CPUs, I/O controllers handle I/O operations exclusively and are connected to channels that are dedicated to I/O operations. In a mainframe system, there may be several CPUs and several I/O processors. The overall IBM architecture is intended to optimize I/O performance without degrading CPU performance. Many mainframe applications include heavily I/O-intensive business applications and the IBM z/architecture helps provide high levels of throughput that distinguish mainframes from other types of computers.

In the IBM z/architecture for mainframes, a channel is a data connection in a hierarchically organized I/O subsystem. In IBM mainframe systems, channels either connect to channel interfaces on devices such as DASDs, printers, terminal concentrators, and so forth (e.g., ESCON, FICON) or they connect to a network (e.g., OSA).

In the IBM z/architecture for mainframes, channels are controlled by channel command words (CCWs) where a channel command word (CCW) is an instruction for a specialized I/O channel processor. The CCW is used to initiate an I/O operation on a channel-attached device. All I/O devices in IBM mainframe systems use CCWs.

In IBM mainframe z/architecture, the CCWs are organized into channel programs. A channel program is a sequence of one or more I/O instructions (that is, one or more CCWs) executed by the I/O channel processor. The operating system signals the I/O channel processor to begin executing the channel program with a SSCH (START SUBCHANNEL) machine instruction. The CPU then is not burdened with I/O operations and proceeds with non-I/O instruction operations until interrupted by an interrupt from the I/O operation. When the I/O operations are complete, the channel posts an interrupt.

When I/O operations are initiated by the machine instruction START SUBCHANNEL, this instruction passes the contents of an operation-request block (ORB) to a subchannel. The contents of the ORB include a subchannel key, an address of the first CCW to be executed, and a specification of the format of the CCWs. The CCW specifies the command to be executed and the storage area, if any, to be used. The execution of START SUBCHANNEL is complete when the ORB contents have been passed to the subchannel and the results of the execution of the instruction are indicated by the condition code set in the program-status word. The CSS fetches the first CCW and decodes it according to the format specified in the ORB.

In order for a non-IBM z/architecture primary computer system having a primary architecture (such as typically used for running Windows, Linux, and/or Unix on a processor) to access data on IBM mainframe-attached DASD storage, an IBM or IBM-compatible mainframe computer performs the functions of the native IBM CSS. Such functions of an IBM CSS include, for example, selecting from multiple paths to devices, dynamic reconnect support, I/O-related measurements, and mainframe configuration support.

Many mainframe computer users have developed, wish to develop, or otherwise acquire computer programs for execution on primary computer systems that are not IBM z/architecture systems. Such users have a need for accessing native I/O storage that operates as IBM mainframe-attached DASD storage.

In order to have greater interoperability of computer systems of different architectures and particularly to have interoperability of I/O operations among such computer systems, there is a need for improved systems operable according to multiple computer architectures.

BRIEF SUMMARY OF THE INVENTION

According to one embodiment, a system includes at least one data storage device having data stored therein and at least one native computer system in communication with the at least one data storage device, the at least one native computer system having resident thereon a controlling operating system. The system also includes at least one primary computer system in communication with the at least one native computer system via at least one first connection, the at least one primary computer system being in communication with the at least one data storage device via at least one second connection that is not in communication with the at least one native computer system, the at least one primary computer system having resident thereon a primary operating system, the at least one primary computer system having a processor executing a primary application. A volume on the at least one data storage device is under logical control of the controlling operating system of the at least one native computer system, and the at least one primary computer system reads or writes data to the volume directly via the at least one second connection.

In another embodiment, a method comprises sending a request from a primary computer system to a native computer system via a first connection, the request requesting access to a dataset in a volume stored on a data storage device by a primary application running on the primary computer system, wherein the volume is under logical control of the native computer system; receiving permission information from the native computer system if the primary application has permission to access the dataset; and using the permission information to access the dataset on the data storage device directly via a second connection that is not in communication with the native computer system.

According to another embodiment, a method comprises receiving at a native computer system a request from a primary computer system via a first connection, the request requesting access to a dataset in a volume stored on a data storage device by a primary application running on the primary computer system, wherein the volume is under logical control of the native computer system; determining whether the primary application has permission to access the dataset; sending permission information to the primary computer system if the primary application has permission to access the dataset; and preventing access to the dataset by applications other than the primary application during a time period when the primary computer system is accessing the dataset for the primary application.

In yet another embodiment, a computer program product comprises a computer readable medium having computer readable program code embodied therewith. The computer readable program code comprises computer readable program code configured to: receive at a native computer system a request from a primary computer system via a first connection, the request requesting access to a dataset in a volume stored on a data storage device by a primary application running on the primary computer system, wherein the volume is under logical control of the native computer system; determine whether the primary application has permission to access the dataset; send permission information to the primary computer system if the primary application has permission to access the dataset; and prevent access to the dataset by applications other than the primary application during a time period when the primary computer system is accessing the dataset for the primary application.

Other aspects and embodiments of the present invention will become apparent from the following detailed description, which, when taken in conjunction with the drawings, illustrate by way of example the principles of the invention.

DETAILED DESCRIPTION

Figure 1:
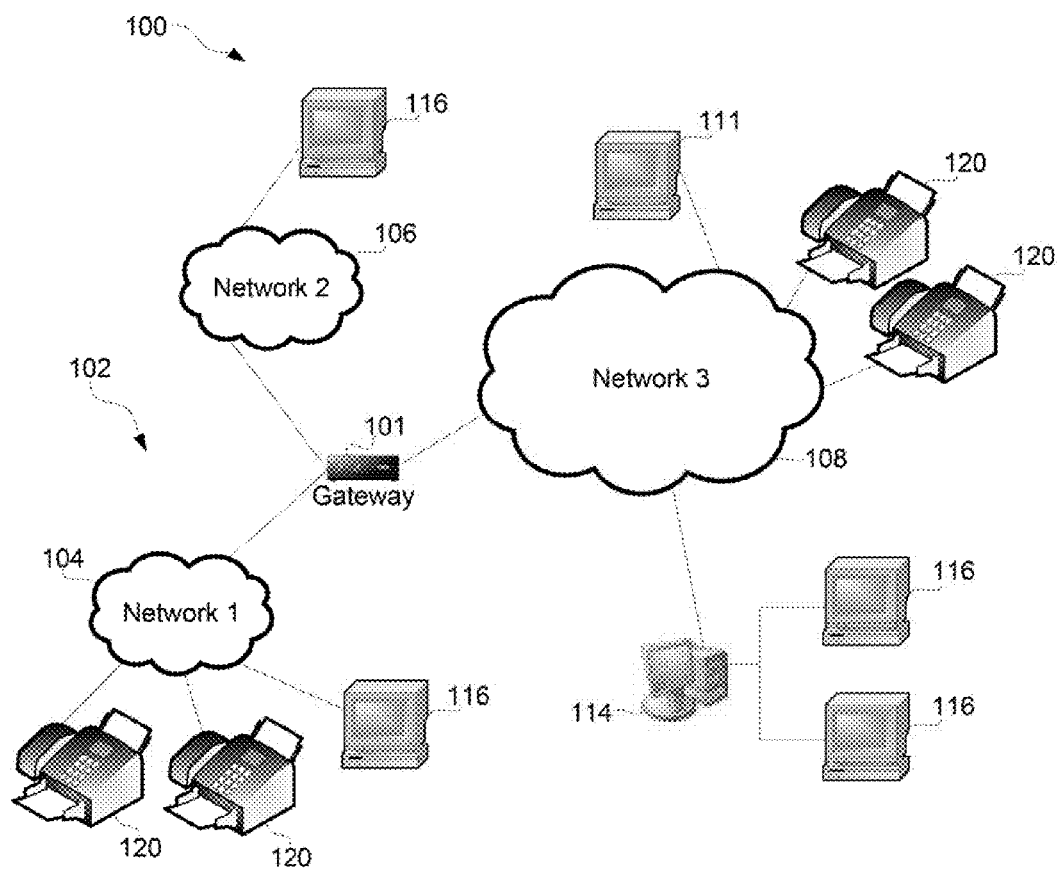
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the teens "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for accessing native I/O devices operating according to requirements of a native computer system.

In one general embodiment, a system comprises a data storage device having data stored therein, a native computer system in communication with the data storage device, the native computer system having resident thereon a controlling operating system, and a primary computer system in communication with the native computer system via a first connection, the primary computer system being in communication with the data storage device via a second connection that is not in communication with the native computer system, the primary computer system having resident thereon a primary operating system, the primary computer system having a processor executing a primary application. A volume on the data storage device is under logical control of the controlling operating system of the native computer system. Also, the primary computer system reads or writes data to the volume directly via the second connection.

In another general embodiment, a method comprises sending a request from a primary computer system to a native computer system via a first connection, the request requesting access to a dataset in a volume stored on a data storage device by a primary application running on the primary computer system, wherein the volume is under logical control of the native computer system, receiving permission information from the native computer system if the primary application has permission to access the dataset, and using the permission information to access the dataset on the data storage device directly via a second connection that is not in communication with the native computer system.

In another general embodiment, a method comprises receiving at a native computer system a request from a primary computer system via a first connection, the request requesting access to a dataset in a volume stored on a data storage device by a primary application running on the primary computer system, wherein the volume is under logical control of the native computer system. The method also comprises determining whether the primary application has permission to access the dataset, sending permission information to the primary computer system if the primary application has permission to access the dataset, and preventing access to the dataset by applications other than the primary application during a time period when the primary computer system is accessing the dataset for the primary application.

In yet another general embodiment, a computer program product comprises a computer readable medium having computer readable program code embodied therewith. The computer readable program code is configured to receive at a native computer system a request from a primary computer system via a first connection, the request requesting access to a dataset in a volume stored on a data storage device by a primary application running on the primary computer system, wherein the volume is under logical control of the native computer system. The computer readable program code is also configured to determine whether the primary application has permission to access the dataset, to send permission information to the primary computer system if the primary application has permission to access the dataset, and to prevent access to the dataset by applications other than the primary application during a time period when the primary computer system is accessing the dataset for the primary application.

As will be appreciated by one skilled in the art, aspects of the present invention may be embodied as a system, method, or computer program product. Accordingly, the present invention may take the form of an entirely hardware embodiment, a software embodiment (including firmware, resident software, micro-code, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked storage units, etc. may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
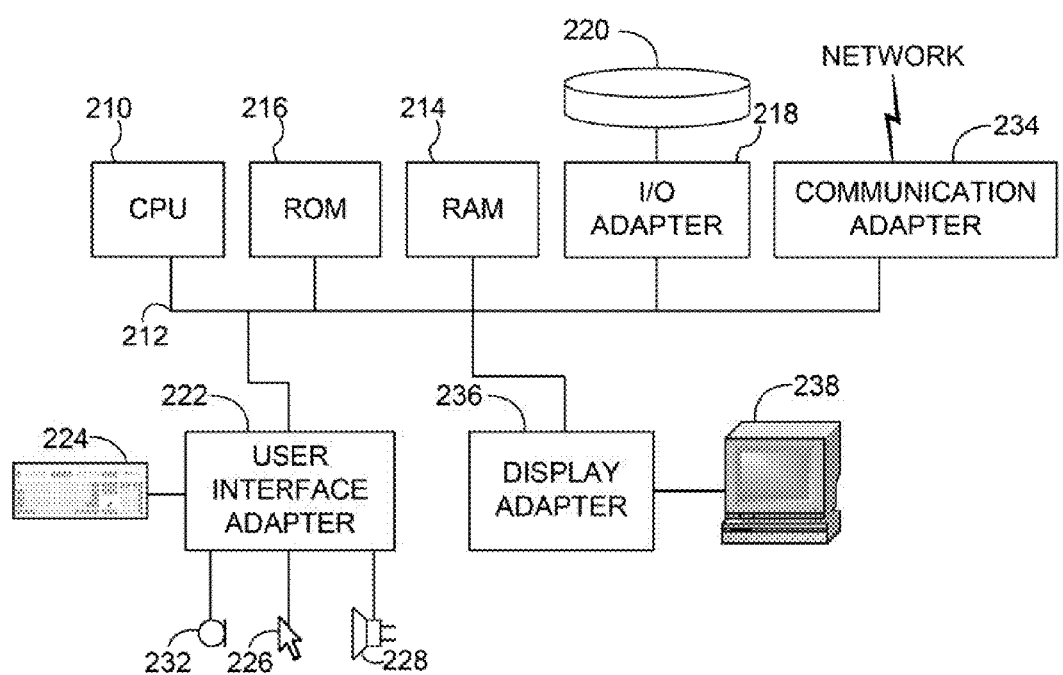
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
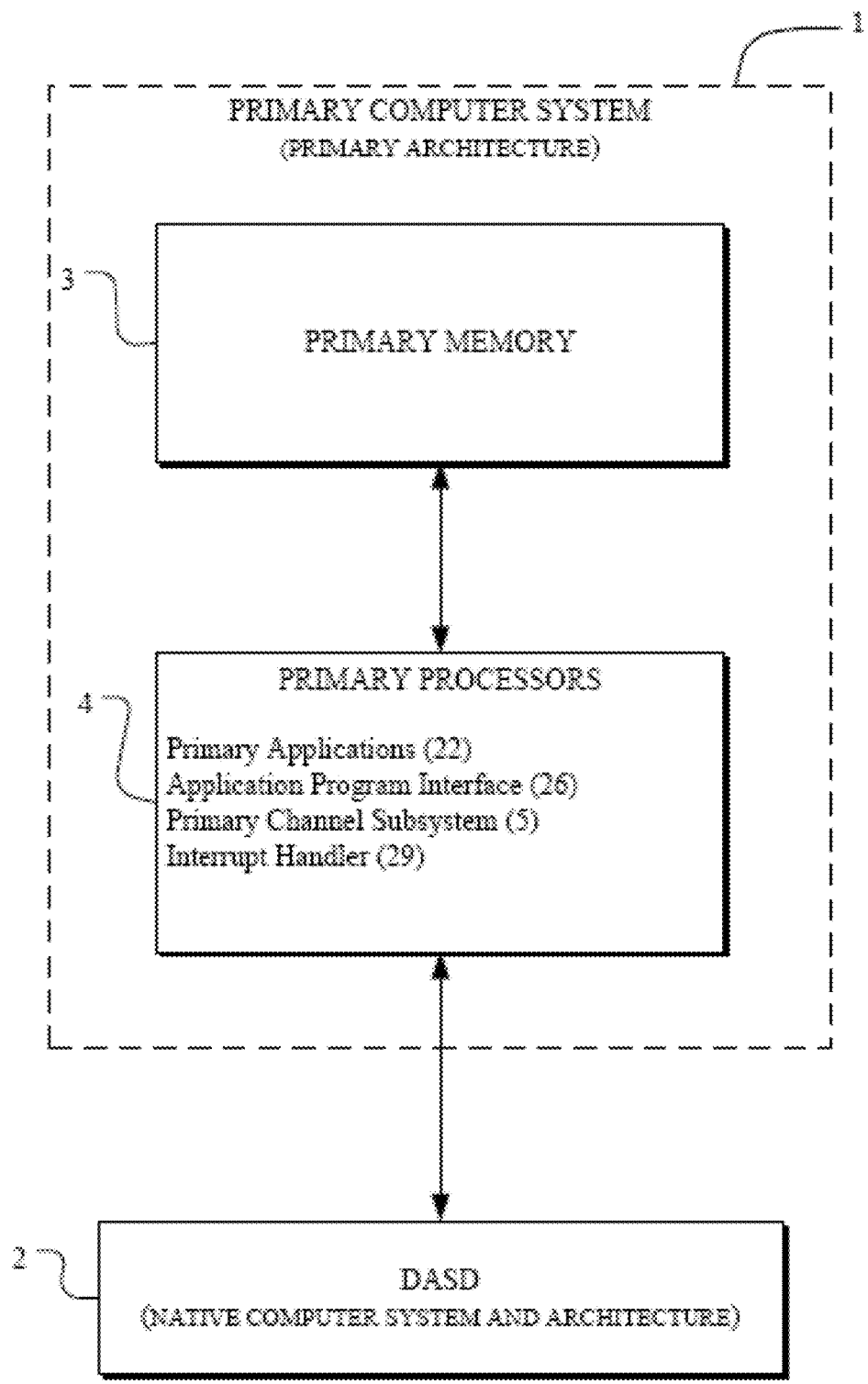
FIG. 3 depicts a block diagram of a primary computer system operating according to a primary architecture connected to a direct access storage device (DASD) operating according to the requirements of a native computer system.

In FIG. 3, the primary computer system 1 is a system running according to a primary architecture. The computer system 1 includes a primary memory 3 and primary processors 4. A direct access storage device (DASD) 2 operates according to the requirements of a native computer system. In one embodiment, the native computer system is an IBM mainframe computer system operating according to the IBM z/Architecture and operating with an IBM z/Operating System (z/OS).

The primary computer system 1 may operate with a Linux, Windows, Unix, or other operating system and executes machine instructions on primary processors 4. The primary processors 4 may be Intel x86_64s, Intel Itaniums (IA-64s), PowerPCs, or other processors. For example, the primary architecture of primary computer system 1 of FIG. 3, where primary processors 4 are Intel Itaniums (IA-64s), is the Intel Itanium architecture. In such an example, that primary architecture is distinguished from the IBM z/Architecture.

According to one embodiment, the primary computer system 1 may execute primary applications having machine instructions that are executed by primary processors 4 according to the primary architecture. The primary applications 22 in the primary architecture access the DASD 2 where the DASD 2 operates according to a native computer system. The DASD 2 may be accessed through a Primary Channel Sub-System (P-CSS) 5. In operation, the primary processors 4 execute an application program interface 26 (API) in order to enable the computer system 1 to communicate with the DASD 2. The application program interface 26 and the interrupt handler 29 are programs that may execute machine instructions of the primary processors 4 under control of the primary architecture.

In FIG. 3, the primary processors 4 may execute computer programs including primary applications 22, an application program interface 26, a primary channel subsystem 5, an interrupt handler 29, and other programs not shown. These computer programs may be executed using machine instructions of the primary processors 4.

In FIG. 3, the Primary Channel Subsystem 5 executed in the primary processors 4 of primary computer system 1 has a high level of compatibility with the channel functions and operations of the IBM z/Architecture so as to enable primary computer system 1 (according to one embodiment, a non-IBM computer system operating according to a non-z/Architecture) to communicate through channels with DASD 2. The communication is carried out even though DASD 2 operates according to the requirements of a native computer system such as an IBM computer system operating according to the IBM z/Architecture. In the primary computer system 1 of FIG. 3, channels are controlled by channel command words (CCWs) where a channel command word (CCW) is an instruction for the primary channel subsystem (P-CSS) 5. The channel command word is used to initiate I/O operations on a channel-attached device, that is, the DASD 2.

In the primary computer system 1, the CCWs are organized into channel programs. A channel program is a sequence of one or more I/O instructions (that is, one or more CCWs) executed by the primary channel subsystem 5. The primary operating system signals the primary channel subsystem 5 to begin executing the channel program with a SSCH (START SUBCHANNEL) API call. The primary processors 4 are available to perform non-I/O instruction operations until interrupted by an interrupt from the I/O operation through the primary channel subsystem 5.

Figure 4:
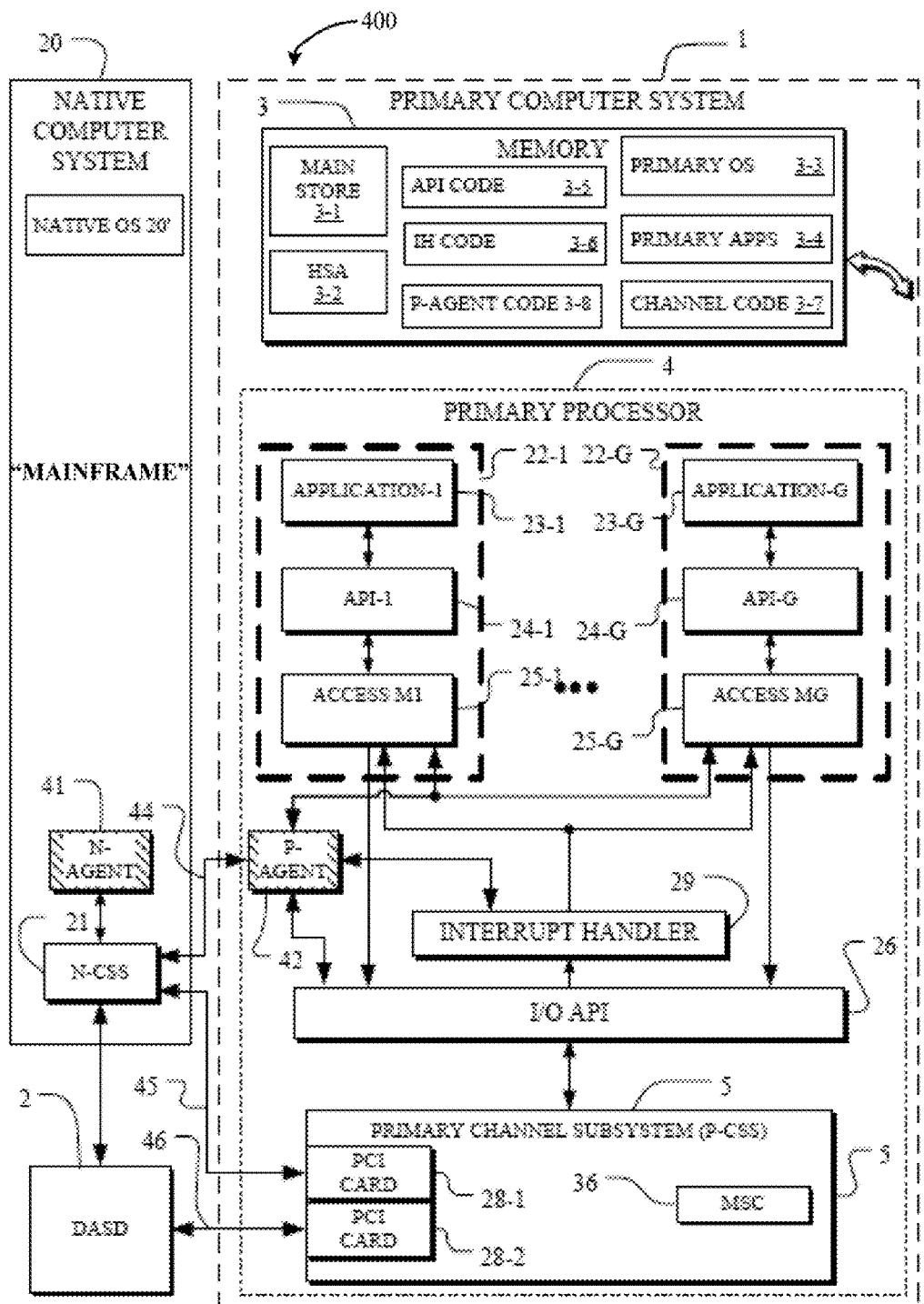
FIG. 4 depicts a block diagram of the primary computer system of FIG. 3 operating according to a primary architecture and a native computer system operating according to a native architecture with both the primary computer system and the native computer system connected to the direct access storage device (DASD) of FIG. 3 operating according to the requirements of a native computer system.

In FIG. 4, one embodiment of the primary computer system 1 is shown where the primary computer system 1 is an open server system running according to a primary architecture. The computer system 1 includes a primary memory 3 and primary processors 4. A direct access storage device (DASD) 2 operates according to the requirements of a native computer system. In some embodiments, the native computer system is an IBM mainframe computer system operating according to the IBM z/Architecture and operating with an IBM z/Operating System (z/OS).

In FIG. 4, the primary processors 4 may execute computer programs including primary applications 22, an I/O application program interface 26, a primary channel subsystem (P-CSS) 5, an interrupt handler 29, a P-Agent 42, and other programs. These computer programs may be executed using machine instructions of the primary processors 4.

In FIG. 4, the primary computer system 1 may operate with a Linux, Windows, Unix, or other operating system and may execute machine instructions on primary processors 4. The primary processors 4 may be Intel x86_64s, Intel Itaniums (IA-64s), PowerPCs, or other processors. The primary architecture of primary computer system 1 of FIG. 3, in an example where primary processors 4 are Intel Itaniums (IA-64s), may be the Intel Itanium architecture and in such an example, the primary architecture may be distinguished from the IBM z/Architecture.

In FIG. 4, according to one embodiment, the native computer system 20 may be an IBM mainframe computer system operating according to the IBM z/Architecture and operating with an IBM z/Operating System (z/OS). The direct access storage device (DASD) 2 may operate according to the native computer system 20 operating with an IBM z/Operating System. The native computer system 20 may include the native channel subsystem 21 which communicates with the DASD 2 using channel programs. The native channel programs may be formed by the native computer system 20.

In FIG. 4, according to one embodiment, the primary computer system 1 may execute primary applications 22, including applications 22-1, 22-2, . . . , 22-G where G is any integer. The primary applications 22 are written to use machine instructions that may execute in primary processors 4 according to the primary architecture. The primary applications 22 may access the DASD 2. The DASD 2 may be accessed through a Primary Channel Sub-System (P-CSS) 5. In operation, the primary processors 4 may execute an I/O application program interface 26 (API) and an interrupt handler 29 in order to enable the primary computer system 1 to communicate with the DASD 2. The application program interface 26 and the interrupt handler 29 may be computer programs that execute machine instructions of the primary processors 4 according to the primary architecture.

In FIG. 4, according to one embodiment, the memory 3 may include locations used in the general operation of the primary computer system 1 for executing the primary applications 22 and may include locations for the channel operations of the I/O API 26, the primary channel sub-system 5, the interrupt handler 29 and the P-Agent 42. Specifically, memory 3 may include MAINSTORE locations 3-1, HSA (Hardware System Area) locations 3-2, PRIMARY OS locations 3-3, PRIMARY APPLICATIONS locations 3-4, API CODE locations 3-5, IH CODE (Interrupt Handler) locations 3-6, CHANNEL CODE locations 3-7 and P-AGENT CODE locations 3-8.

In FIG. 4, according to some embodiments, communication between the primary computer system 1 and the DASD 2 may occur in three ways. In a first embodiment, the I/O API 26 communicates directly with DASD 2 through PCI CARD 28-2 and connection 46. In a second embodiment, the I/O API 26 communicates with DASD 2 through PCI CARD 28-1 over a channel-to-channel adapter connection 45 to native agent, N-AGENT 41, and the native channel subsystem, N-CSS 21. In a third embodiment, the I/O API 26 communicates directly with DASD 2 over a TCP/IP connection 44 to the native channel subsystem 21.

In FIG. 4, the I/O API 26 may include a set of library function calls that implement the equivalent functionality of mainframe I/O instructions (SSCH, TSCH, etc.). Communication between the POSS and the Primary Channel Sub-System 5 may use request and interrupt queues in HSA 3-2 along with semaphores. All or some information may be transferred using the queues. The semaphores may be used to wake up the receiving process.

Figure 5:
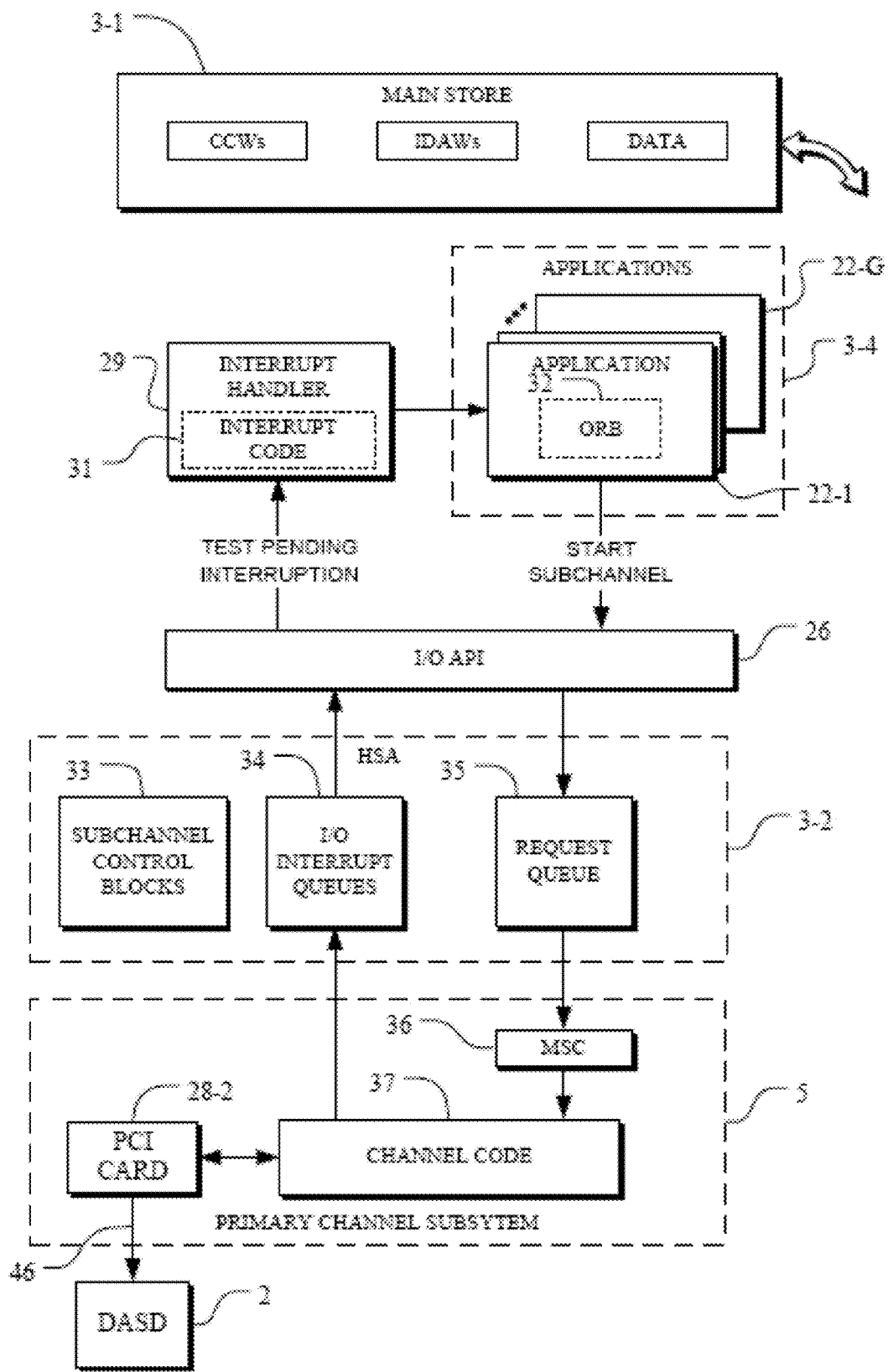
FIG. 5 depicts a block diagram of further details of the primary computer system of FIG. 3 and FIG. 4.
Figure 6:
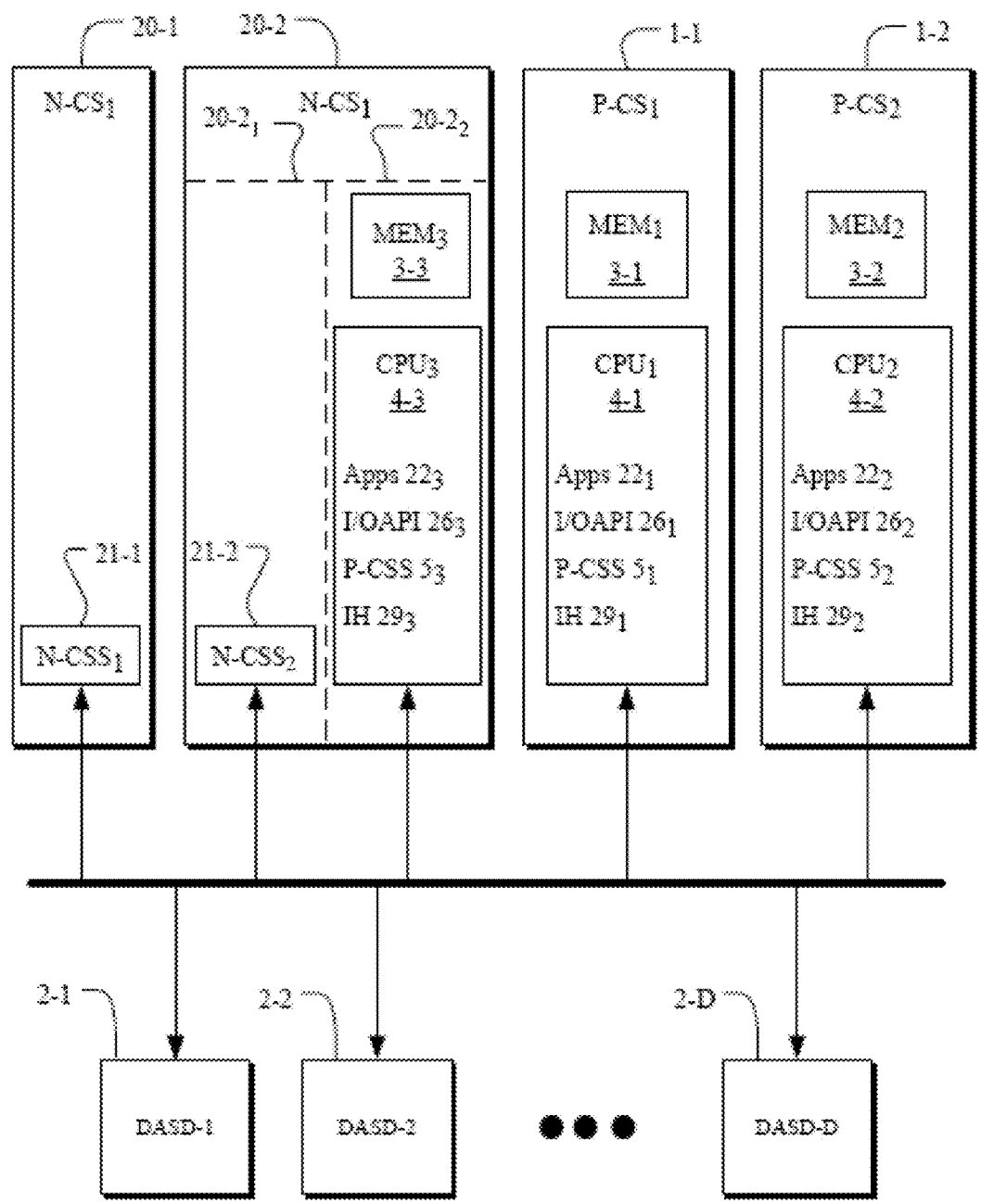
FIG. 6 depicts an array of computer systems including multiple native computer systems and multiple primary computer systems connected to multiple direct access storage device (DASDs).

In FIG. 5, further details of the primary computer system 1 of FIG. 3 and FIG. 4 are shown, according to one embodiment. The primary applications 22, including applications 22-1, 22-2, . . . , 22-G, may connect to the application program interface 26. Returns from the I/O application program interface 26 may be through an interrupt handler 29 and interrupt code 31. The application program interface 26 may access locations in HSA 3-2. The HSA 3-2 may include Subchannel Control Blocks 33, I/O Interrupt Queues 34 and a Request Queue 35. Information may be transferred between HSA 3-2 and the primary channel subsystem 5. The primary channel subsystem 5 may include MSC code 36, other channel code 37, PCI CARD code 28-2 connecting over physical connector 4 to DASD 2.

To send a request to the Primary Channel Subsystem (P-CSS) 5, the POSS may call functions in the I/O API 26. The functions do exception checking, copy necessary data to HSA 3-2 (for example, for the SSCH instruction, the ORB 32 may be copied to the SCB 33), queue the request, and signal the MSC 36 process to wake up and handle the request, according to one approach. Some I/O API functions, such as StoreSubchannel, TestSubchannel, and TestPendingInterruption do not send a request to the MSC 36, in one approach.

To post an I/O interrupt from P-CSS 5, P-CSS 5 may queue the interrupt on the I/O Interrupt Queue 34 and may signal the interrupt handler 29, in one approach. To receive an interrupt, interrupt handler 29 may call the TestPendingInterruption I/O API function. This function may be: blocking, in which case it does not return until a signal is received from P-CSS 5; or non-blocking, in which case it returns immediately with an indication of whether an interrupt is present, according to some approaches.

A channel report word (CRW) may be used to include information affecting the channel subsystem and CRWs may be stored at the designated locations. To post a channel report word, P-CSS 5 may enqueue (place in the queue) the channel report word (CRW), may queue the interrupt on the I/O Machine Check Queue, and may signal the interrupt handler 29, in one approach. This signal is the same as for an I/O interrupt, so when it occurs, TestPendingInterruption wakes up and returns 0, meaning there is no I/O interrupt pending, in which case interrupt handler 29 calls StoreChannelReportWord for storing the CRW at a specified location.

In mainstore 3-1 (pHost) absolute addresses are used in the ORB, CCWs, IDAWs, and SCSW. When a mainstore 3-1 (pHost) address is provided, it has already been locked down by virtue of being pre-allocated so the address won't change during I/O. Primary hardware obtains output data from CPU caches if necessary when the Luminex or FICON offload (or Emulex) card fetches it using DMA. The primary operating system flushes data about to be DMA'ed out of any cache containing the most up-to-date version of the data.

In one embodiment, with reference to FIG. 4, a system 400 comprises a data storage device 2 having data stored therein and a native computer system 20 in communication with the data storage device 2, the native computer system 20 having resident thereon a controlling operating system 20'. The system 400 also includes a primary computer system 1 in communication with the native computer system 20 via a first connection 44. The primary computer system 1 is in communication with the data storage device 2 via a second connection 46 that is not in communication with the native computer system 20, and the primary computer system 1 has resident thereon a primary operating system 3-3, the primary computer system 1 having a processor 4 executing a primary application (one of 22-1, 22-2, . . . 22-G). The first connection 44 may include a network protocol connection, and the second connection 46 may include a fiber optic cable, according to some approaches. A volume on the data storage device 2 is under logical control of the controlling operating system 20' of the native computer system 20, and the native computer system 20 reads or writes data to the volume directly (i.e., without the data passing through the native computer system 20) via the second connection 46.

According to some embodiments, the second connection 46 may have a higher data throughput rate than the first connection 44.

According to some approaches, the native computer system 20 may run an agent (such as N-Agent 41) for assisting in coordinating accesses to the data storage device 2 by the native computer system 20 and primary computer system 1.

In some approaches, the primary computer system 1 may send a request to the native computer system 20 via the first connection 44, the request requesting access to a dataset in the volume by the primary application (one of 22-1, 22-2, . . . 22-G), wherein the native computer system 20 verifies that the primary application has permission to access the dataset and sends permission information to the primary computer system 1 if the primary application has permission to access the dataset. Also, the primary computer system 1 may use the permission information to access the dataset on the data storage device 2 directly using the second connection 46. In some further approaches, the native computer system 20 may prevent access to the dataset by applications other than the primary application during a time period when the primary computer system 1 is accessing the dataset for the primary application. Also, in some approaches, the primary computer system 1 may send a message to the native computer system 20 via the first connection 44 that the access to the dataset is finished, wherein the native computer system 20 may stop preventing access to the dataset by applications other than the primary application.

Figure 7:
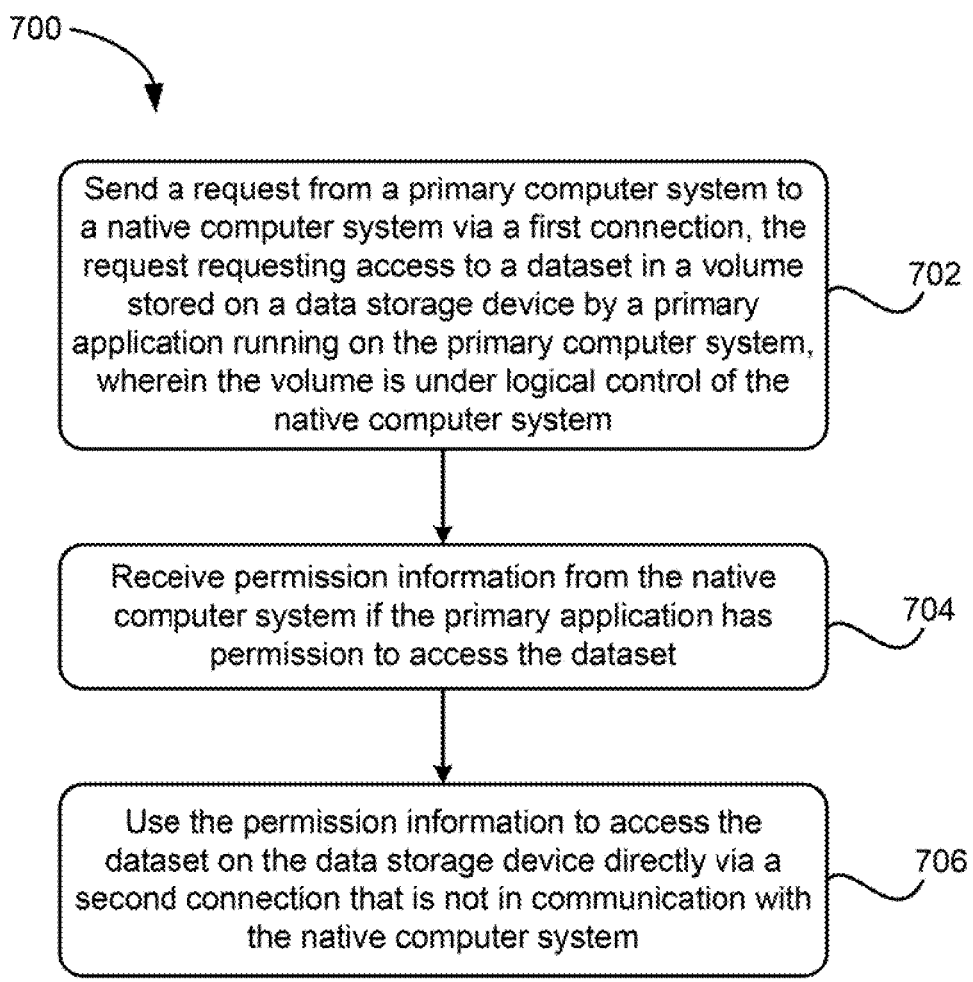
FIG. 7 is a flowchart depicting a method according to one embodiment.

Now referring to FIG. 7, according to another embodiment, a method 700 (which may be executed on a primary computer system 1 side of a system, such as the system 400 described above) includes several operations. The method 700 may be carried out in any desired environment, and is not limited to only those environments described herein.

In operation 702, a request is sent from a primary computer system (such as primary computer system 1 in FIG. 4) to a native computer system (such as native computer system 20 in FIG. 4) via a first connection (such as connection 44 in FIG. 4), the request requesting access to a dataset in a volume stored on a data storage device (such as DASD 2 in FIG. 4) by a primary application (such as one of applications 22-1, 22-2, . . . 22-G in FIG. 4) running on the primary computer system. The volume is under logical control of the native computer system.

In operation 704, permission information is received from the native computer system if the primary application has permission to access the dataset.

In operation 706, the permission information is used to access the dataset on the data storage device directly via a second connection (such as connection 46) that is not in communication with the native computer system (except possibly through the primary computer system or data storage device).

According to some embodiments of the method 700, the second connection may have a higher data throughput rate than the first connection.

In more approaches of method 700, the first connection may include a network protocol connection, and the second connection may include a fiber optic cable.

According to some embodiments of method 700, the native computer system may prevent access to the dataset by applications other than the primary application during a time period when the primary computer system is accessing the dataset for the primary application. Further, in some approaches, the primary computer system may send a message to the native computer system via the first connection that the access to the dataset is finished, and the native computer system may stop preventing access to the dataset by applications other than the primary application.

Figure 8:
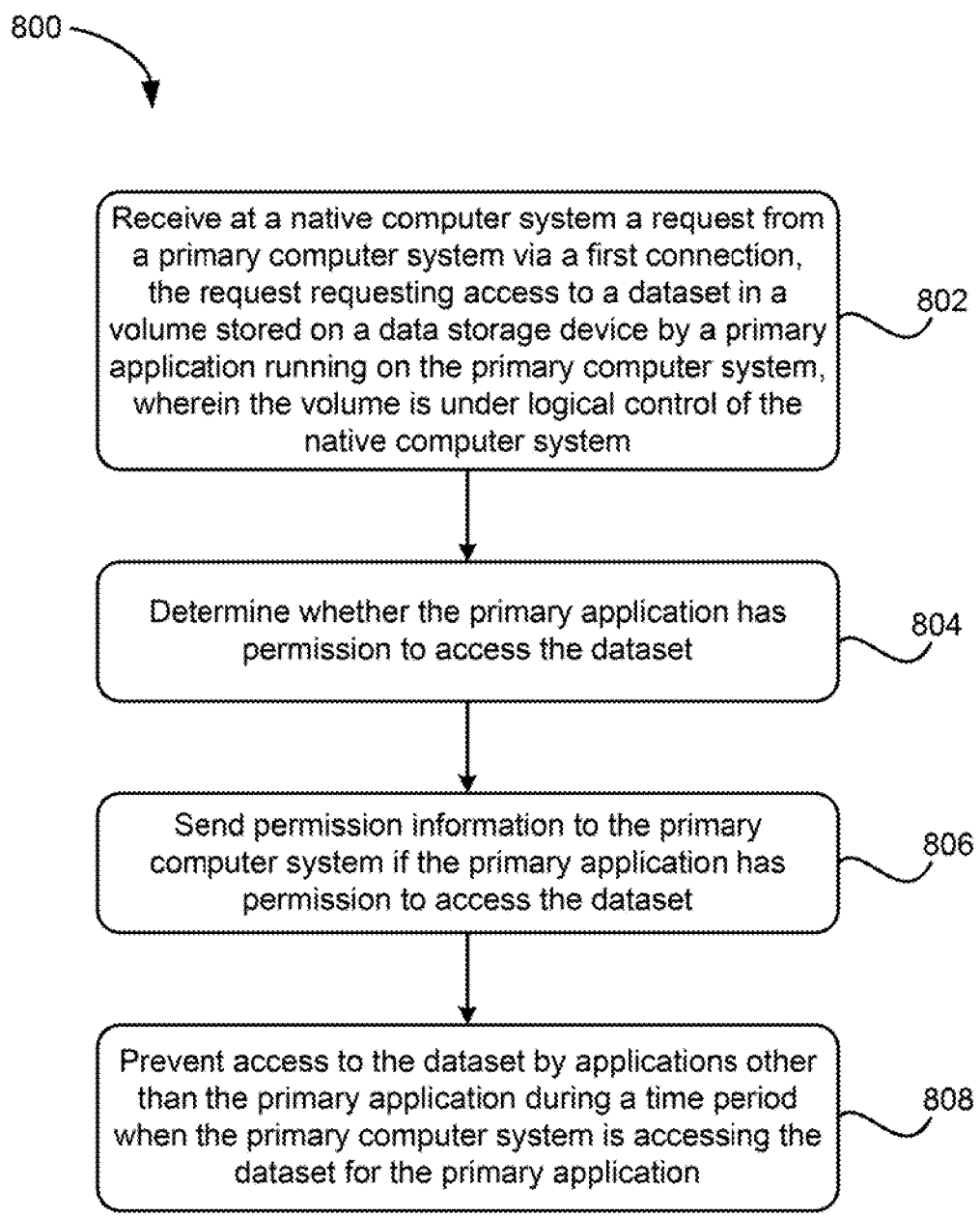
FIG. 8 is a flowchart depicting a method according to one embodiment.

Now referring to FIG. 8, according to another embodiment, a method 800 (which may be executed on a native computer system 20 side of a system, such as the system 400 described above) includes several operations. The method 800 may be carried out in any desired environment, and is not limited to only those environments described herein.

In operation 802, at a native computer system (such as native computer system 20 in FIG. 4), a request is received from a primary computer system (such as primary computer system 1 in FIG. 4) via a first connection (such as connection 44 in FIG. 4), the request requesting access to a dataset in a volume stored on a data storage device (such as DASD 2 in FIG. 4) by a primary application (such as one of applications 22-1, 22-2, . . . 22-G in FIG. 4) running on the primary computer system. The volume is under logical control of the native computer system.

According to some approaches, the primary computer system may access the dataset via a second connection (such as connection 46 in FIG. 4) that is not in communication with the native computer system. In addition, the second connection may have a higher data throughput rate than the first connection.

In operation 804, it is determined whether the primary application has permission to access the dataset.

In operation 806, permission information is sent to the primary computer system if the primary application has permission to access the dataset.

In operation 808, access to the dataset by applications other than the primary application is prevented during a time period when the primary computer system is accessing the dataset for the primary application.

In some approaches, the method 800 may further comprise running an agent (such as N-Agent 41 in FIG. 4) for assisting in coordinating accesses to the data storage device by the native and primary computer systems.

In more approaches, the method 800 may further comprise receiving a message from the primary computer system via the first connection that the access to the dataset is finished, and the method 800 may further comprise stopping the preventing access to the dataset by applications other than the primary application upon receiving the message.

Any of the above described methods may be embodied in a computer program product. One such computer program product (which may be executed on a native computer system side of a system) comprises a computer readable medium having computer readable program code embodied therewith. The computer readable program code is configured to receive at a native computer system a request from a primary computer system via a first connection, the request requesting access to a dataset in a volume stored on a data storage device by a primary application running on the primary computer system, wherein the volume is under logical control of the native computer system. The computer readable program code is also configured to determine whether the primary application has permission to access the dataset, to send permission information to the primary computer system if the primary application has permission to access the dataset, and to prevent access to the dataset by applications other than the primary application during a time period when the primary computer system is accessing the dataset for the primary application.

In some approaches, the computer program product may further comprise computer readable program code configured to run an agent for assisting in coordinating accesses to the data storage device by the native and primary computer systems.

In more embodiments, the computer program product may further comprise computer readable program code configured to receive a message that the access to the dataset is finished from the primary computer system via the first connection, and to stop preventing access to the dataset by applications other than the primary application upon receiving the message.

EXAMPLES

Example 1

An example may be presented with reference to FIG. 4. In FIG. 4, an application or program 22 executing on the target operating system 3-3 may try to access the data stored on a DASD or device 2 under the logical control of the controlling (native) operating system 20' of the native computer system 20. The controlling operating system 20' may be responsible for ensuring the security and data integrity of the data residing on the storage device 2. When the program 22 tries to read or write data to the device 2, messages may be sent to the controlling operating system 20' to verify that the program 22 has permission to access the data. The location of the data on the device 2 may be determined either directly by accessing the 'directory' (table of contents) of the device 2 or by sending a message to the controlling operating system 20' asking for the location. When the location is determined, the program 22 may use a direct connection 45 to read or write the data to the device 2. Messages may be sent over connection 44 to the controlling operating system 20' if an update uses locks, catalog, or directory updates or other services that only the controlling operating system 20' can provide. In some cases, the entire access may be done with messages to the controlling operating system 20'. In other cases, data integrity and security can be assured using only direct access 45 to the data on the device 2. This agent 41 on the controlling operating system 20' may assist in coordinating the data access between the operating systems 3-3 and 20'.

TABLES 1 and 2, with reference to FIG. 4, may be used to describe another example (Example 2). Example 2 includes steps according to one embodiment, as shown in TABLE 1 which may be implemented through the pseudo code included in TABLE 2.

TABLE 1

1. A dataset resides on a DASD 2 volume controlled by z/OS 20' on native computer system 20.
2. A program 22-1 on primary computer system 1 tries to read and update some records in that dataset.
3. Program 22-1 makes an OPEN request, the OPEN processing by P-agent 42 on primary computer system 1 passes the OPEN request to the N-agent 41 on native computer system 20.

TABLE 1-continued

4. The N-agent 41 on native computer system 20 verifies, via RACF, that program 22-1 has permission to access the dataset. The N-agent 41 also determines the location of the dataset on the DASD 2 and ENQs the dataset as appropriate to prevent other programs from reading or writing the dataset while it is being used by program 22-1.
5. The N-agent 41 passes the location and permission information back to P-agent 42 of the primary computer system 1.
6. OPEN processing on primary computer system 1 saves the information and indicates to program 22-1 that the dataset is open and available for use.
7. Program 22-1 does normal I/O functions which are interpreted on primary computer system 1 using the information retrieved from the N-agent 41 on native computer system 20 to access the DASD 2 volumes containing the dataset directly.
8. When program 22-1 closes the dataset, primary computer system 1 sends a message to native computer system 20 which the N-agent 41 uses to close the dataset and release any ENQs as well as update any catalog, directory or accounting records.

TABLE 2

Pseudo Code for Example 2

| Program 22 on Primary System 1 | P-Agent 42 | N-Agent 41 | N-OS 20' |
|---|---|---|---|
| (Step 3) Open "some.data" | | | |
| | Find "some.data" Send N-Agent 41 request to open "some.data" | | |
| | | (Step 4) Verify that Program 22 on Primary Computer System 1 has authority to access "some.data" on Native system 20. Locate the data on the physical disk of DASD 2 and reserve it for use by Program 22, and (Step 5) pass location to P-Agent 42 | |
| | (Step 6) Save location and return to Program 22 | | |
| (Step 7) Read from "some.data" | | | |
| | Access the disk directly and return the data to Program 22 | | |
| Process the data Write to "some.data" | | | |
| | Access the disk directly | | |
| (Step 8) Close "some.data" | | | |
| | Notify N-Agent 41 that "some.data" has been closed | | |
| | | | Release the reserve on "some.data" |

Note that the code presented below as an example is devoid of error and exception handling as well as common infrastructure. It illustrates some concepts of an embodiment without the implementation details useful in a functional computer program.

Code for Program 22 on Primary Computing System 1:

```
{
    remote_FILE *f;
    char data[80];
    char *data_to_write = "This is some data.";
    // open a file named SOME.DATA on host BIGIRON for reading and writing
    f = remote_OPEN("BIGIRON","SOME.DATA","RW");
    // read some data from the file
    while (!remote_EOF(f))
    {
        if (remote_READ(f,data,80))
            printf("%s\n",data);
    }
    // write some data at the end of the file
    remote_WRITE(f,data_to_write,strlen(data_to_write));
    // close the file
    remote_CLOSE(f);
}
```

Code for P-Agent 42:

```
remote_FILE *remote_OPEN(char *host,char *filename,char *mode)
{
    MSG *msg;
    RESPONSE *response;
    remote_FILE *f;
    TOKEN *token;
    // create open message
    msg = create_message(OPEN_MSG,filename,mode);
    // send to host
    response = sendMessageAndWait(hostname,msg);
    // build file structure
    f = malloc(sizeof(remote_FILE));
    f->token = response->token;
    f->status = response->status;
    strcpy(f->hostname,hostname);
    free(msg);
    free(response);
    return;
}
int remote_READ(remote_FILE *f,char *buffer,int buflen)
{
    MSG *msg;
    RESPONSE *response;
    int datalen;
    // create read message
    msg = create_message(READ_MSG,f->token,buflen);
    // send to host
    response = sendMessageAndWait(f->hostname,msg);
    // build file structure
    f->status = response->status;
    datalen = response->datalen;
    strncpy(buffer,response->data,buflen);
    free(msg);
```

```
    free(response);
    return datalen;
}
int remote_WRITE(remote_FILE *f,char *buffer,int buflen)
{
    MSG *msg;
    RESPONSE *response;
    int datalen;
    // create read message
    msg = create_message(WRITE_MSG,f->token,buffer,buflen);
    // send to host
    response = sendMessageAndWait(f->hostname,msg);
    // build file structure
    f->status = response->status;
    datalen = response->datalen;
    free(msg);
    free(response);
    return datalen;
}
int remote_EOF(remote_FILE *f))
{
    return f->status == 0;
}
int remote_CLOSE(remote_FILE *f)
{
    MSG *msg;
    RESPONSE *response;
    int rc;
    // create read message
    msg = create_message(CLOSE_MSG,f->token);
    // send to host
    response = sendMessageAndWait(f->hostname,msg);
    // build file structure
    rc = response->status;
    free(msg);
    free(response);
    free(f);
    return rc;
}
```

Code for N-Agent 41:

```
FILE *openFileCache[ ];
process_OPEN_msg(MSG *msg)
{
    int token;
    token = findFreeFileCacheEntry( );
    openFileCache[token] = OPEN(msg->filename,msg->mode);
    create_response(msg,token,openFileCache[token].status);
    sendResponseMessage(msg);
}
process_READ_msg(MSG *msg)
{
    READ(openFileCache[msg->token],msg->data,msg->datalen);
    create_response(msg);
    sendResponseMessage(msg);
}
process_WRITE_msg(MSG *msg)
{
    WRITE(openFileCache[msg->token],msg->data,msg->datalen);
    create_response(msg);
    sendResponseMessage(msg);
}
process_CLOSE_msg(MSG *msg)
{
    CLOSE(openFileCache[msg->token]);
    freeFileCacheEntry(msg->token);
    create_response(msg);
    sendResponseMessage(msg);
}
```

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
at least one data storage device having data stored therein;
at least one native computer system in duplex communication with the at least one data storage device, the at least one native computer system having resident thereon a controlling operating system; and
at least one primary computer system in duplex communication with the at least one native computer system via at least one first connection, the at least one primary computer system being in duplex communication with the at least one data storage device via at least one second connection that is not in communication with the at least one native computer system, the at least one primary computer system having resident thereon a primary operating system, the at least one primary computer system having a processor executing a primary application,
wherein a volume on the at least one data storage device is under logical control of the controlling operating system of the at least one native computer system,
wherein the at least one primary computer system is configured to read and write data to the volume directly via the at least one second connection, and
wherein when the primary computer system is accessing a dataset in the volume, the at least one native computer system prevents access to the dataset by applications other than the primary application,
wherein the at least one second connection has a higher data throughput rate than the at least one first connection.

2. The system of claim 1, wherein the at least one first connection includes a network protocol connection, wherein the at least one second connection includes a fiber optic cable.

3. The system of claim 1, wherein the at least one native computer system runs an agent for assisting in coordinating accesses to the at least one data storage device by the at least one native and primary computer system.

4. A system, comprising:
at least one data storage device having data stored therein;
at least one native computer system in duplex communication with the at least one data storage device, the at least one native computer system having resident thereon a controlling operating system; and at least one primary computer system in duplex communication with the at least one native computer system via at least one first connection, the at least one primary computer system being in duplex communication with the at least one data storage device via at least one second connection that is not in communication with the at least one native computer system, the at least one primary computer system having resident thereon a primary operating system, the at least one primary computer system having a processor executing a primary application, wherein a volume on the at least one data storage device is under logical control of the controlling operating system of the at least one native computer system, wherein the at least one primary computer system is configured to read and write data to the volume directly via the at least one second connection, and wherein when the primary computer system is accessing a dataset in the volume, the at least one native computer system prevents access to the dataset by applications other than the primary application, wherein the at least one primary computer system sends a request to the at least one native computer system via the at least one first connection, the request requesting access to a dataset in the volume by the primary application, wherein the at least one native computer system verifies that the primary application has permission to access the dataset and sends permission information to the at least one primary computer system if the primary application has permission to access the dataset, wherein the at least one primary computer system uses the permission information to access the dataset on the at least one data storage device directly using the at least one second connection.

5. The system of claim 4, wherein the at least one primary computer system sends a message to the at least one native computer system via the at least one first connection indicating that the access to the dataset is finished upon completing the access to the dataset.

6. The system of claim 5, wherein the preventing access to the dataset by applications other than the primary application is stopped and a catalog or a directory is updated with current information upon receiving the message from the primary computer system indicating that the access to the dataset is finished.

7. A method, comprising:
sending a request from a primary computer system to a native computer system via a first duplex connection, the request requesting read and write access to a dataset in a volume stored on a data storage device by a primary application running on the primary computer system, wherein the volume is under logical control of the native computer system;

receiving permission information from the native computer system when the primary application has permission to access the dataset;

using the permission information to access the dataset on the data storage device directly via a second duplex connection that is not in communication with the native computer system; and preventing access to the dataset by applications other than the primary application using the native computer system when the primary computer system is accessing the dataset for the primary application, wherein the second duplex connection has a higher data throughput rate than the first duplex connection.

8. The method of claim 7, wherein the first duplex connection includes a network protocol connection, wherein the second duplex connection includes a fiber optic cable.

9. A method, comprising:
sending a request from a primary computer system to a native computer system via a first duplex connection, the request requesting read and write access to a dataset in a volume stored on a data storage device by a primary application running on the primary computer system, wherein the volume is under logical control of the native computer system;

receiving permission information from the native computer system when the primary application has permission to access the dataset;

using the permission information to access the dataset on the data storage device directly via a second duplex connection that is not in communication with the native computer system;

preventing access to the dataset by applications other than the primary application using the native computer system when the primary computer system is accessing the dataset for the primary application; and receiving a message from the primary computer system via the first duplex connection, the message indicating that the access to the dataset is finished.

10. The method of claim 9, further comprising stopping the preventing access to the dataset by applications other than the primary application and updating a catalog or a directory with current information upon receiving the message indicating that the access to the dataset is finished.

11. A method, comprising:
receiving at a native computer system a request from a primary computer system via a first duplex connection, the request requesting access to a dataset in a volume stored on a data storage device by a primary application running on the primary computer system, wherein the volume is under logical control of the native computer system;

determining whether the primary application has permission to access the dataset;

sending permission information to the primary computer system if the primary application has permission to access the dataset; and preventing access to the dataset by applications other than the primary application during a time period when the primary computer system is accessing the dataset for the primary application, wherein the primary computer system accesses the dataset via a second connection that is not in communication with the native computer system, wherein the second connection has a higher data throughput rate than the first duplex connection.

12. A method, comprising
receiving at a native computer system a request from a primary computer system via a first duplex connection, the request requesting access to a dataset in a volume stored on a data storage device by a primary application running on the primary computer system, wherein the volume is under logical control of the native computer system;

determining whether the primary application has permission to access the dataset;

sending permission information to the primary computer system if the primary application has permission to access the dataset;

preventing access to the dataset by applications other than the primary application during a time period when the primary computer system is accessing the dataset for the primary application; and receiving a message from the primary computer system via the first duplex connection that the access to the dataset is finished, and further comprising stopping the preventing access to the dataset by applications other than the primary application upon receiving the message.

13. The method of claim 12, wherein the primary computer system accesses the dataset via a second connection that is not in communication with the native computer system.

14. The method of claim 12, further comprising running an agent for assisting in coordinating accesses to the data storage device by the native and primary computer systems.

15. A computer program product, the computer program product comprising:

a non-transitory computer readable medium having computer readable program code embodied therewith, the computer readable program code comprising:

computer readable program code configured to receive at a native computer system a request from a primary computer system via a duplex first connection, the request requesting access to a dataset in a volume stored on a data storage device by a primary application running on the primary computer system, wherein the volume is under logical control of the native computer system;

computer readable program code configured to determine whether the primary application has permission to access the dataset;

computer readable program code configured to send permission information to the primary computer system if the primary application has permission to access the dataset;

computer readable program code configured to prevent access to the dataset by applications other than the primary application during a time period when the primary computer system is accessing the dataset for the primary application;

computer readable program code configured to receive a message that the access to the dataset is finished from the primary computer system via the duplex first connection; and computer readable program code configured to stop preventing access to the dataset by applications other than the primary application upon receiving the message.

16. The computer program product of claim 15, further comprising computer readable program code configured to run an agent for assisting in coordinating accesses to the data storage device by the native and primary computer systems.

* * * * *